United States Patent
Villa et al.

(10) Patent No.: US 8,478,688 B1
(45) Date of Patent: Jul. 2, 2013

(54) RAPID TRANSACTION PROCESSING

(75) Inventors: Yael Villa, Tel Aviv (IL); Alon Kaufman, Bnei-Dror (IL); Ayelet Eliezer, Givatayim (IL); Marcelo Blatt, Modiin (IL); Tomer Meidan, Ramat Gan (IL)

(73) Assignee: EMC Corporation, Hopkintown ( * ) Notice: Subject to any disclaimer, the term of this patent is extended or adjusted under 35 U.S.C. 154(b) by 0 days.

(21) Appl. No.: 13/329,377

(22) Filed: Dec. 19, 2011

(51) Int. Cl.
*G06Q 40/00* (2012.01)
(52) U.S. Cl.
USPC ............................................. 705/38; 705/35
(58) Field of Classification Search
None
See application file for complete search history.

(56) References Cited

U.S. PATENT DOCUMENTS

| | | | |
|---|---|---|---|
| 6,108,583 A | 8/2000 | Schneck et al. | |
| 6,330,546 B1 * | 12/2001 | Gopinathan et al. | 705/35 |
| 7,251,624 B1 * | 7/2007 | Lee et al. | 705/35 |
| 7,398,918 B1 * | 7/2008 | Schwartz, Jr. | 235/380 |
| 7,668,776 B1 * | 2/2010 | Ahles | 705/38 |
| 7,813,944 B1 * | 10/2010 | Luk et al. | 705/4 |
| 7,908,644 B2 | 3/2011 | Roskind et al. | |
| 7,950,573 B1 * | 5/2011 | Enright et al. | 235/379 |
| 8,050,997 B1 * | 11/2011 | Nosek et al. | 705/37 |
| 8,160,960 B1 * | 4/2012 | Fei et al. | 705/39 |
| 8,280,833 B2 * | 10/2012 | Miltonberger | 706/45 |
| 2002/0035543 A1 * | 3/2002 | Shedd et al. | 705/44 |
| 2002/0194119 A1 * | 12/2002 | Wright et al. | 705/38 |
| 2003/0130919 A1 * | 7/2003 | Templeton et al. | 705/35 |
| 2003/0135450 A1 * | 7/2003 | Aguais et al. | 705/38 |
| 2003/0216988 A1 * | 11/2003 | Mollett et al. | 705/35 |
| 2003/0233325 A1 * | 12/2003 | Belyi | 705/42 |
| 2004/0267660 A1 * | 12/2004 | Greenwood et al. | 705/38 |
| 2005/0080717 A1 * | 4/2005 | Belyi et al. | 705/38 |
| 2005/0102242 A1 * | 5/2005 | Omidyar | 705/65 |
| 2005/0125360 A1 * | 6/2005 | Tidwell et al. | 705/65 |
| 2005/0159996 A1 * | 7/2005 | Lazarus et al. | 705/10 |
| 2005/0209938 A1 * | 9/2005 | Czyzewski et al. | 705/30 |
| 2006/0064374 A1 * | 3/2006 | Helsper et al. | 705/39 |
| 2007/0106582 A1 * | 5/2007 | Baker et al. | 705/35 |
| 2007/0138259 A1 * | 6/2007 | Dragt et al. | 235/380 |
| 2007/0168277 A1 * | 7/2007 | Marchesi | 705/38 |
| 2007/0244741 A1 * | 10/2007 | Blume et al. | 705/10 |
| 2007/0299775 A1 * | 12/2007 | Algiene | 705/45 |
| 2008/0046334 A1 * | 2/2008 | Lee et al. | 705/26 |
| 2008/0077515 A1 * | 3/2008 | Zoldi et al. | 705/35 |
| 2008/0140576 A1 * | 6/2008 | Lewis et al. | 705/67 |
| 2008/0154668 A1 * | 6/2008 | Kuo et al. | 705/7 |
| 2008/0215465 A1 * | 9/2008 | Capadouca | 705/30 |
| 2008/0301040 A1 * | 12/2008 | Knudson et al. | 705/39 |
| 2009/0132347 A1 * | 5/2009 | Anderson et al. | 705/10 |
| 2009/0164365 A1 * | 6/2009 | Dragt et al. | 705/38 |
| 2009/0182653 A1 * | 7/2009 | Zimiles | 705/30 |

(Continued)

*Primary Examiner* — Gregory Johnson
(74) *Attorney, Agent, or Firm* — BainwoodHuang

(57) ABSTRACT

An improved technique identifies risky transactions from a set of transactions and updates risk scores only for those transactions identified as risky. Along these lines, a transaction sorting engine sorts the set of transactions according to risk score. The transaction sorting engine identifies as risky those transactions having risk scores above a specified percentile; for instance, the transactions having risk scores above the $90^{th}$ percentile would be identified as risky. Some time later, a risk score engine adjusts, based on new historical transaction data, Bayesian weights which it uses to compute risk scores. The transaction sorting engine sends to the risk score engine only those transactions it identified as risky. The risk score engine computes new risk scores for the risky transactions and makes the new risk scores available to the transaction sorting engine so that it can sort all of current transactions (e.g., received within the past week).

20 Claims, 4 Drawing Sheets

U.S. PATENT DOCUMENTS

| | | | |
|---|---|---|---|
| 2009/0192957 A1* | 7/2009 | Subramanian et al. | 706/21 |
| 2009/0222369 A1* | 9/2009 | Zoldi et al. | 705/35 |
| 2009/0240624 A1* | 9/2009 | James et al. | 705/44 |
| 2009/0248559 A1* | 10/2009 | Recce et al. | 705/35 |
| 2009/0248560 A1* | 10/2009 | Recce et al. | 705/35 |
| 2009/0327132 A1* | 12/2009 | Diev et al. | 705/44 |
| 2010/0005013 A1* | 1/2010 | Uriarte | 705/30 |
| 2010/0125470 A1* | 5/2010 | Chisholm | 705/7 |
| 2010/0228656 A1* | 9/2010 | Wasserblat et al. | 705/35 |
| 2010/0280882 A1* | 11/2010 | Faith et al. | 705/10 |
| 2010/0287099 A1* | 11/2010 | Liu et al. | 705/44 |
| 2010/0305993 A1* | 12/2010 | Fisher | 705/7 |
| 2011/0047076 A1* | 2/2011 | Carlson et al. | 705/44 |
| 2011/0055074 A1* | 3/2011 | Chen et al. | 705/39 |
| 2011/0082781 A1* | 4/2011 | Hu et al. | 705/35 |
| 2011/0125658 A1* | 5/2011 | Lanxner et al. | 705/318 |
| 2011/0131122 A1* | 6/2011 | Griffin et al. | 705/35 |
| 2011/0173116 A1* | 7/2011 | Yan et al. | 705/38 |
| 2011/0238510 A1* | 9/2011 | Rowen et al. | 705/16 |
| 2011/0238564 A1* | 9/2011 | Lim et al. | 705/38 |
| 2011/0288989 A1* | 11/2011 | Maddipati et al. | 705/38 |
| 2011/0307382 A1* | 12/2011 | Siegel et al. | 705/44 |
| 2012/0030083 A1* | 2/2012 | Newman et al. | 705/35 |
| 2012/0041876 A1* | 2/2012 | Nosek et al. | 705/42 |
| 2012/0047053 A1* | 2/2012 | Favreau et al. | 705/35 |
| 2012/0066125 A1* | 3/2012 | Ma et al. | 705/44 |
| 2012/0130853 A1* | 5/2012 | Petri et al. | 705/26.35 |
| 2012/0158585 A1* | 6/2012 | Ganti | 705/44 |
| 2012/0226613 A1* | 9/2012 | Adjaoute | 705/44 |

* cited by examiner

40

```
┌─────────────────────────────────────────┐
│ Adjusting a configuration of a risk     │
│ score engine to form an adjusted risk   │
│ score engine, the adjusted risk score   │
│ engine being constructed and arranged   │
│ to compute a new value of the risk      │
│ score for a transaction                 │
│ 42                                      │
└─────────────────────────────────────────┘
                    │
                    ▼
┌─────────────────────────────────────────┐
│ Running each transaction of a subsetof  │
│ the set of transactions through the     │
│ adjusted risk score engine to generate  │
│ a new value of the risk score for each  │
│ transaction of the subset of            │
│ transactions, each transaction of the   │
│ subset of transactions having the       │
│ previous value of the risk score of     │
│ the transaction being above a threshold │
│ value of the risk score                 │
│ 44                                      │
└─────────────────────────────────────────┘
                    │
                    ▼
┌─────────────────────────────────────────┐
│ Not running transactions of another     │
│ subset of the set of transactions       │
│ through the adjusted risk score engine, │
│ each transaction of the another subset  │
│ of transactions having the previous     │
│ value of the risk score of the          │
│ transaction being below the threshold   │
│ 44          value of the risk score     │
└─────────────────────────────────────────┘
```

Fig. 4

RAPID TRANSACTION PROCESSING

BACKGROUND

Some service providers use conventional risk-based authentication systems to process customer transactions. For example, an online bank may employ a risk engine of such a risk-based authentication system to assign risk scores to banking transactions where higher risk scores indicate higher risk. The online bank may choose to manually investigate the transactions with the highest risk score (i.e., the riskiest transactions) before completing these transactions or shortly after completing these transactions.

At the end of a processing interval (e.g., at the end of each day), the service provider may update the risk engine with the results of the manually investigated transactions. For example, the service provider may have manually discovered particular transaction attributes that closely correlate with fraudulent transactions such as certain times of the day, certain IP addresses, and certain geographical locations. The service provider may then have the risk engine reprogrammed for the next processing interval so that future transactions having these particular transaction attributes are given higher risk scores by the risk engine.

In an effort to identify recently completed fraudulent transactions, conventional risk-based authentication systems have the updated risk engine re-run all transactions from the previous processing interval to identify risky completed transactions for further investigation. Often, such a re-run of all transactions from the previous processing interval discovers completed transactions that were not assigned a high risk score during initial processing but should be investigated as possibly fraudulent nevertheless.

SUMMARY

Unfortunately, there are deficiencies with the above-described conventional risk-based authentication systems. For example, assignment of risk scores to transactions is very expensive. Because conventional risk-based authentication systems assigns risk scores to all transactions from the previous processing interval, the assigning of risk scores represents a heavy computational load when the number of transactions from the previous processing interval is substantial (e.g., greater than 100,000). It has been found, however, that transactions having low risk scores are unlikely to be investigated as possibly fraudulent simply because the risk engine has been reprogrammed. Because the great majority of the previous transactions have low risk scores, much of the effort going into risk score assignment is wasted.

In contrast to conventional risk-based authentication systems which compute the risk score for all transactions, an improved technique identifies risky transactions from a set of transactions and, when a risk score engine used to compute risk scores for transactions is updated, recomputes risk scores only for those transactions identified as risky. Along these lines, a transaction sorting engine sorts the set of transactions according to risk score. The transaction sorting engine identifies as risky those transactions having risk scores above a specified percentile; for instance, the transactions having risk scores above the $90^{th}$ percentile would be identified as risky. Some time later, a risk score engine adjusts, based on new historical transaction data, Bayesian weights which it uses to compute risk scores. The transaction sorting engine sends to the risk score engine only those transactions it identified as risky. The risk score engine computes new risk scores for the risky transactions and makes the new risk scores available to the transaction sorting engine so that it can sort all of current transactions (e.g., received within the past week). The transaction sorting engine then identifies, from the resorting, transactions above, say, the $99^{th}$ percentile of risk score to be sent to a backend evaluator for further investigation.

Advantageously, the improved technique allows for the assigning of new risk scores to transactions in a fraction of the time it would have taken had all current transactions had their risk scores recomputed. There are several benefits to this unburdening of the computational load, one of which is that there can be time to perform other offline adaptive authentication tasks. Another benefit is that the transaction sorting engine is able to rank substantially more transactions without incurring additional computational costs. Because the updating of risk scores is targeted to only those transactions having an appreciable amount of risk information, adaptive authentication becomes more efficient.

One embodiment of the improved technique is directed to a method of identifying risky transactions from a set of transactions. The method includes adjusting a configuration of the risk score engine to form an adjusted risk score engine, the adjusted risk score engine being constructed and arranged to compute a new value of the risk score for a transaction. The method also includes running each transaction of a subset of the set of transactions through the adjusted risk score engine to generate a new value of the risk score for each transaction of the subset of transactions, each transaction of the subset of transactions having the previous value of the risk score of the transaction being above a threshold value of the risk score. The method further includes not running transactions of another subset of the set of transactions through the adjusted risk score engine, each transaction of the another subset of transactions having the previous value of the risk score of the transaction being below the threshold value of the risk score.

Additionally, some embodiments of the improved technique are directed to a system for identifying risky transactions from a set of transactions. The system includes a network interface coupled to a network, a memory and processor coupled to the memory, the processor configured to carry the method of identifying risky transactions from a set of transactions.

Furthermore, some embodiments of the improved technique are directed to a computer program product having a non-transitory computer readable storage medium which stores code including a set of instructions to carry the method of identifying risky transactions from a set of transactions.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 4 is a flow chart illustrating a method of carrying out the improved technique within the electronic environment shown in FIG. 1.

DETAILED DESCRIPTION

An improved technique identifies risky transactions from a set of transactions and, when a risk score engine used to compute risk scores for transactions is updated, recomputes risk scores only for those transactions identified as risky. Along these lines, a transaction sorting engine sorts the set of transactions according to risk score. The transaction sorting engine identifies as risky those transactions having risk scores above a specified percentile; for instance, the transactions having risk scores above the $90^{th}$ percentile would be identified as risky. Some time later, a risk score engine adjusts, based on new historical transaction data, Bayesian weights which it uses to compute risk scores. The transaction sorting engine sends to the risk score engine only those transactions it identified as risky. The risk score engine computes new risk scores for the risky transactions and makes the new risk scores available to the transaction sorting engine so that it can sort all of current transactions (e.g., received within the past week). The transaction sorting engine then identifies, from the resorting, transactions above, say, the $99^{th}$ percentile of risk score to be sent to a backend evaluator for further investigation.

Figure 1:
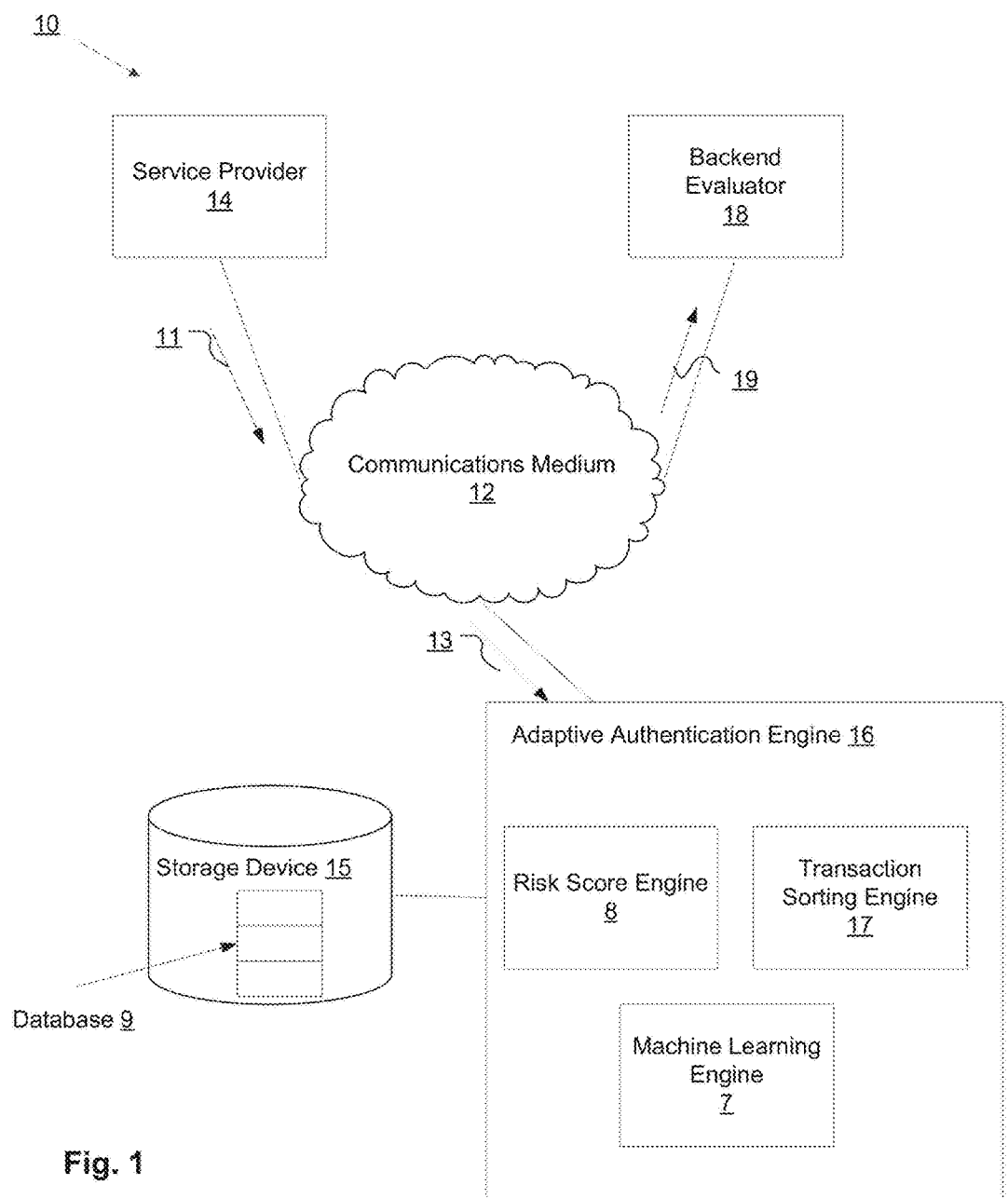
FIG. 1 is a schematic diagram illustrating an electronic environment for carrying out the improved technique.

FIG. 1 illustrates an electronic environment 10 for carrying out the improved technique. Electronic environment 10 includes communications medium 12, service provider 14, adaptive authentication engine 16, storage device 15, and backend evaluator 18.

Communication medium 12 provides network connections between backend evaluator 18, service provider 14, and adaptive authentication engine 16. Communications medium 12 may implement a variety of protocols such as TCP/IP, UDP, ATM, Ethernet, Fibre Channel, combinations thereof, and the like. Furthermore, communications media 12 may include various components (e.g., cables, switches/routers, gateways/bridges, NAS/SAN appliances/nodes, interfaces, etc.). Moreover, the communications medium 12 are capable of having a variety of topologies (e.g., queue manager-and-spoke, ring, backbone, multi drop, point to-point, irregular, combinations thereof, and so on).

Service provider 14 is constructed and arranged to send transaction 11 to adaptive authentication engine 16 via communications medium 14.

Backend evaluator 18 is constructed and arranged to receive a set of very risky transactions 19 from adaptive authentication engine 16. Backend evaluator 18 is also constructed and arranged to perform a backend evaluation on the set of very risky transactions 19 in order to ascertain whether each very risky transaction is fraudulent. Backend evaluator 19 is further constructed and arranged to send results 13 of backend evaluation to adaptive authentication engine 16.

Adaptive authentication engine 16 is constructed and arranged to receive transaction 11 from service provider 14 over communications medium 12. Adaptive authentication engine 16 is also constructed and arranged to access transaction data in database 9 stored on storage device 15. Adaptive authentication engine 16 is further constructed and arranged to receive results 13 of backend evaluation in order to update Bayesian weights used in risk score computation. Adaptive authentication engine 16 is further constructed and arranged to send the set of very risky transactions 19 to backend evaluator 18.

Figure 2:
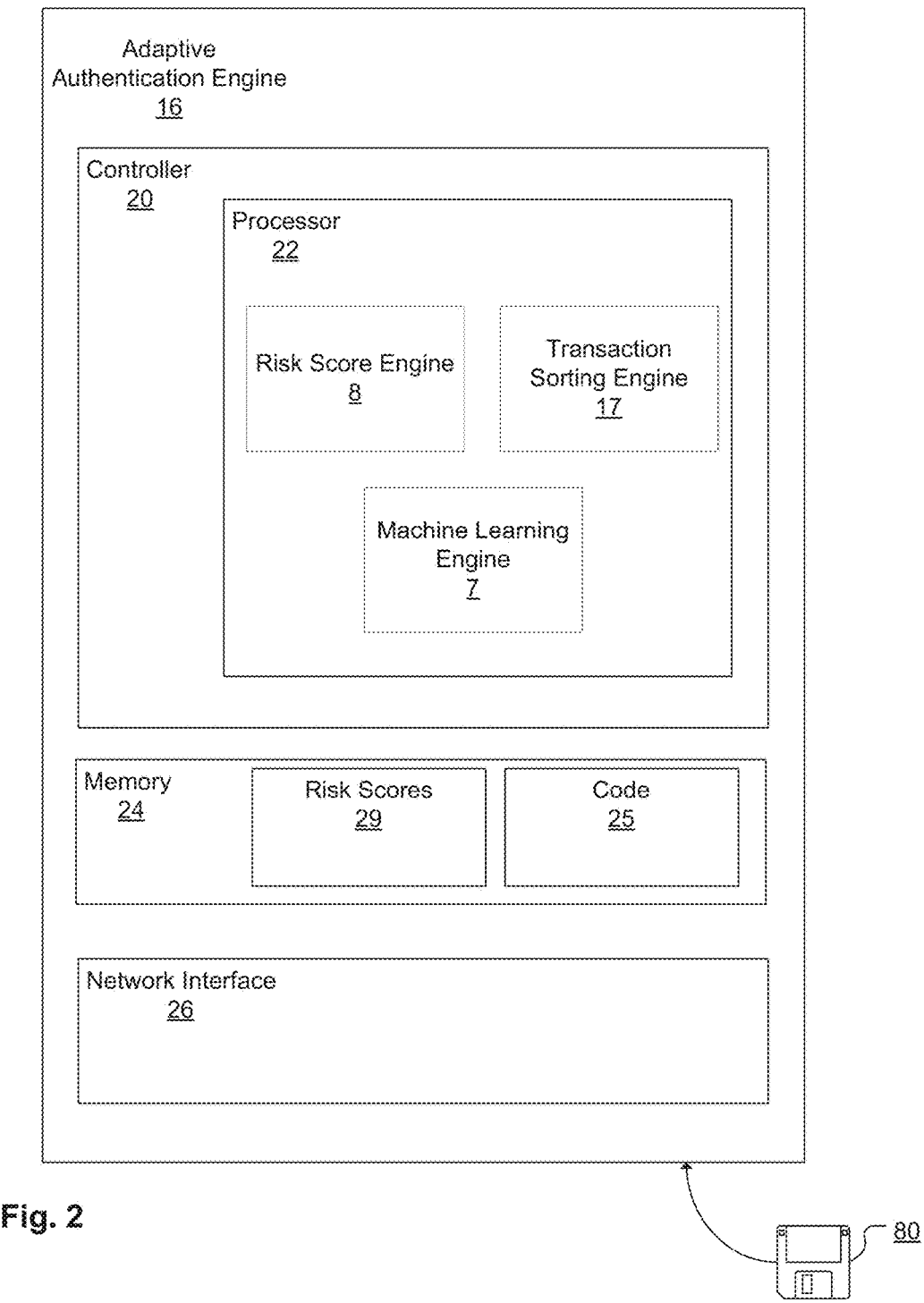
FIG. 2 is a schematic diagram illustrating the adaptive authentication engine within the electronic environment shown in FIG. 1.

Further details concerning adaptive authentication engine 16 are considered with respect to FIG. 2.

FIG. 2 illustrates components of adaptive authentication engine 16. Transaction sorting engine 17 includes a controller 20 which in turn includes processor 22, a memory 24 and a network interface 26.

Memory 24 is configured to store code 25 which includes instructions to identify risky transactions from a set of transactions. Memory 24 is further configured to store risk scores 29. Memory 24 generally takes the form of, e.g., random access memory, flash memory or a non-volatile memory.

Processor 22 takes the form of, but is not limited to, Intel or AMD-based MPUs, and can include a single or multi-cores each running single or multiple threads. Processor 22 is coupled to memory 24 and is configured to execute the code 25 stored in memory 24. Processor 22 includes machine learning engine 7, risk score engine 15, and transaction sorting engine 17.

Machine learning engine 7 is constructed and arranged to receive results 13 of backend evaluation. Machine learning engine 7 is also constructed and arranged to store Bayesian weights in a memory accessible to risk score engine 8 and adjust the Bayesian weights according to results 13 of backend evaluation.

Risk score engine 8 is constructed and arranged to assign a risk score to a transaction based on the Bayesian weights stored in memory. Risk score engine 8 is further constructed and arranged to store the assigned risk score for the transaction in a memory accessible to transaction sorting engine 17.

Transaction sorting engine 17 is constructed and arranged to access the assigned risk score 29 for each transaction of a set of transactions under consideration from memory 24. Transaction sorting engine 17 is also constructed and arranged to rank transactions according to risk score, and send risky transactions having a risk score above a particular percentile threshold to risk score engine 8 after machine learning engine 7 has adjusted the Bayesian weights. Transaction sorting engine 17 is further constructed and arranged to send very risky transactions 19 as determined from the ranking to backend evaluator 18.

Network interface 26 is constructed and arranged to send and receive data over communications medium 12. Specifically, network interface 26 is configured to receive authentication request 13 from institutional server 14 over communications medium 12 and to send challenge activity to UI device 18 via institutional server 14. Also, network interface 26 is constructed and arranged to receive data from storage device 15.

Returning to FIG. 1, storage device 15 is constructed and arranged to store database 9 which contains previous transaction data. Storage device 15 is further constructed and arranged to receive requests to access transaction data from and send transaction data to adaptive authorization engine 16.

During operation, service provider 14 sends transaction 11 to adaptive authorization engine 16. Upon receipt of transaction 11 over network interface 26, risk score engine 8 assigns a risk score to transaction 11 based on Bayesian weights stored in a local memory. Once the risk score is assigned, risk score engine 8 stores transaction 11 in database 9.

Also stored in database 9 are previous transactions that had been sent to service provider within a certain time window. For example, all previous transactions that are less than 7 days old are stored in database 9. Previous transactions had been ranked by transaction sorting engine 17 the previous evening, and the ranking is stored in memory 24.

It should be understood that, during the previous evening, machine learning engine 7 received results 19 of backend evaluation and performed a machine learning operation in order to adjust the Bayesian weights. These adjusted Bayesian weights were used to compute the risk score associated with transaction 11. The risk scores for the previous transactions, however, were computed using the unadjusted Bayesian weights.

The need now is to incorporate the risk scores of new transactions such as transaction 11 into the rankings along with the risk scores for the previous transactions. Because the risk scores for the previous transactions were computed using the unadjusted Bayesian weights, however, risk score engine 8 will need to compute the risk scores for the previous transactions using the adjusted Bayesian weights.

Transaction sorting engine 17 accesses the rankings of the previous transactions stored in database 9 and selects only a selected percentage of the transactions having the highest risk scores; for example, this percentage corresponds to the top 10% of risk scores; these selected transactions constitute the risky transactions of the set of previous transactions stored in database 9. Transaction sorting engine 17 sends these risky transactions to risk score engine 8 in order to compute new risk scores for these transactions based on the adjusted Bayesian weights.

Advantageously, by having transaction sorting engine 17 select only the risky transactions for recalculation of risk scores, adaptive authentication engine 16 is able to work with far more transactions than if risk score engine 8 had to recalculate the risk scores of all of the previous transactions. For example, if the risky transactions constitute 10% of the previous transactions, then adaptive authentication engine 16 will be able to perform adaptive authentication operations on ten times more transactions than if all previous transactions required risk score recalculation. The reason for this is that risk score computation represents the most resource-intensive part of the process of selecting the riskiest transactions from a large set of transactions. By being able to process far more transactions, adaptive authentication engine 16 is able to provide a more accurate sample representing the riskiest transactions to service provider 14.

Once risk score engine 8 has recalculated the risk scores of the risky transactions, risk score engine 8 stores these updated risk scores in database 9 with the corresponding previous transaction data. Once this is done, transaction ranking engine 17 is ready to rank not only the previous transactions, but also transactions such as transaction 11 to which risk score engine 8 assigned risk scores with adjusted Bayesian weights. Risk score engine 17 ranks all of these transactions by risk score according to a ranking scheme.

In some arrangements, adaptive authentication engine 16 purges previous transactions having an age (i.e., the time since being received by service provider 14) greater than seven days. These old transactions are typically sent to an archiving database in a separate storage device, but in any case they are removed from database 9.

It should be understood that there are many ways of ranking transactions by risk scores in an efficient manner. Typically, such ranking schemes assign to each risk score a scaled risk score which represents a quantity by which transaction sorting engine 17 will select the risky transactions for recalculation. One instance of such a ranking scheme is shown with regard to FIG. 3.

Figure 3:
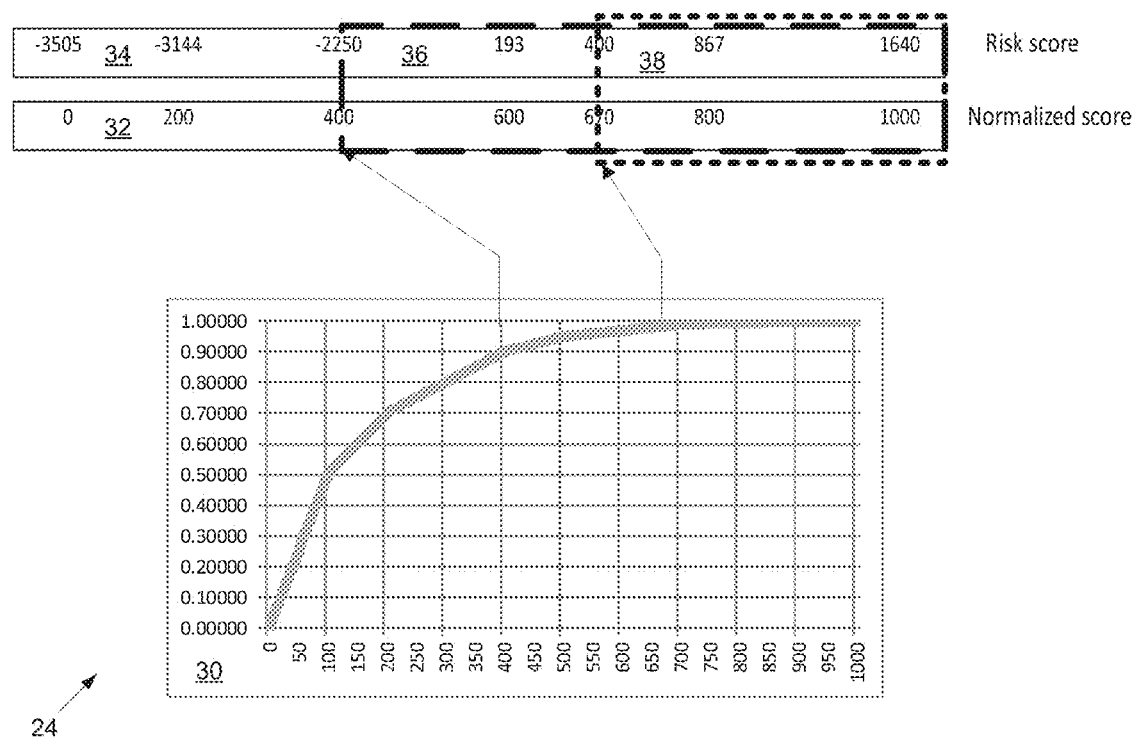
FIG. 3 is a schematic diagram illustrating raw and scaled risk scores stored in the memory shown in FIG. 2.

FIG. 3 illustrates an example of a ranking scheme 30 for use in selecting the riskiest transactions from a large set of transactions stored in memory 24. Ranking scheme 30 represents a scale from 0-1000 of risk scores in increments of 10 by which raw risk scores 32 are mapped to scaled risk scores 34. Note that the range of values of raw risk scores 32 can change from day-to-day, while the definition of the scaled risk scores 34 remains fixed.

Each scaled risk score represents a percentile of risk scores. For example, a transaction having a scaled risk score of 100 represents a transaction having a risk score in the $50^{th}$ percentile of risk scores of all transactions. Additionally, a scaled risk score of 200 represents the $70^{th}$ percentile, 300 the $80^{th}$ percentile, 400 the $90^{th}$ percentile, 500 the $95^{th}$ percentile, 700 the $99^{th}$ percentile, and 900 the $99.7^{th}$ percentile. Under this scale, previous transactions having a scaled risk score of 400 or higher are considered risky transactions 36, which transaction sorting engine 17 will send to risk score engine 8 for recalculation of risk scores.

Further, transactions having a risk score of 670 or above are considered the riskiest transactions 38. Adaptive authentication engine 16 sends riskiest transactions 38 to backend evaluator 18 for further, typically manual, evaluation. Backend evaluator 18 sends the results of such further evaluation of the riskiest transactions back to adaptive authentication engine 16, whereby machine learning engine 7 uses the results to generate adjusted Bayesian weights.

In some arrangements, transaction sorting engine 17 further partitions transaction 11 into instantiations of each of several partition keys. Examples of such partition keys include organization and event type. For example, transaction sorting engine 17 identifies transaction 17 as belonging to a retail organization and being a session login; that is, for transaction 11, the value of the partition key "organization" is "retail," and the value of the partition key "event type" is "session login." By partitioning transactions in this manner, transaction sorting engine provides for a more accurate filtering of the riskiest transactions having particular properties, because the partition keys can be used as parameters in computing Bayesian weights.

FIG. 4 illustrates a method 40 of identifying risky transactions from a set of transactions. In step 42, a configuration of the risk score engine is adjusted to form an adjusted risk score engine, the adjusted risk score engine being constructed and arranged to compute a new value of the risk score for a transaction. In step 44, each transaction of a subset of the set of transactions is run through the adjusted risk score engine to generate a new value of the risk score for each transaction of the subset of transactions, each transaction of the subset of transactions having the previous value of the risk score of the transaction being above a threshold value of the risk score. In the meantime, transactions of another subset of the set of transactions are not run through the adjusted risk score engine, each transaction of the another subset of transactions having the previous value of the risk score of the transaction being below the threshold value of the risk score.

While various embodiments of the invention have been particularly shown and described, it will be understood by those skilled in the art that various changes in form and details may be made therein without departing from the spirit and scope of the invention as defined by the appended claims.

For example, the times in between adjusting Bayesian weights and updating risk scores for the risky transactions can differ from a day, and can be, for example, shorter, as in 12 hours, or longer, as in a week.

Further, the scaled risk score used to identify risky transactions can be based on a linear scale of percentiles, for instance, or any other such scale. The scaled risk score can also be based on a quantity other than percentile, such as standard deviation from a mean risk score.

Furthermore, it should be understood that some embodiments are directed to adaptive authentication engine 16 which is constructed and arranged to identify risky transactions from a set of transactions. Some embodiments are directed to adaptive authentication engine 16. Some embodiments are directed to a system which identifies risky transactions from a set of transactions. Some embodiments are directed to a process of identifying risky transactions from a set of transactions. Also, some embodiments are directed to a computer program product which enables computer logic to identify risky transactions from a set of transactions.

In some arrangements, adaptive authentication engine 16 is implemented by a set of processors or other types of control/processing circuitry running software. In such arrangements, the software instructions can be delivered to adaptive authentication engine 16 in the form of a computer program product 80 (FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of identifying risky transactions from a set of transactions, each transaction of the set of transactions having a previous value of a risk score, the previous value of the risk score having been computed by a risk score engine, the method comprising:
    adjusting a configuration of the risk score engine to form an adjusted risk score engine, the adjusted risk score engine being constructed and arranged to compute a new value of the risk score for a transaction;
    running each transaction of a subset of the set of transactions through the adjusted risk score engine to generate a new value of the risk score for each transaction of the subset of transactions, each transaction of the subset of transactions having the previous value of the risk score of the transaction being above a threshold value of the risk score;
    not running transactions of another subset of the set of transactions through the adjusted risk score engine, each transaction of the another subset of transactions having the previous value of the risk score of the transaction being below the threshold value of the risk score;
    prior to adjusting the configuration of the risk score engine, sorting the set of transactions in a descending order according to the previous value of the risk score of each transaction of the set of transactions, and
    assigning, to each transaction of the set of transactions, a previous value of a scaled risk score, a set of values of the scaled risk score having a specified minimum value and maximum value, each value of the set of values of the scaled risk score corresponding to a percentile of values of the risk score;
    wherein the threshold value of the risk score corresponds to a specified threshold value of the scaled risk score.

2. A method according to claim 1, further comprising:
    receiving a set of new transactions within a unit of time;
    running each transaction of the set of new transactions through the adjusted risk score engine to generate a new value of the risk score for the transaction as the transaction is received;
    after running each transaction of the subset of the set of transactions and the set of new transactions through the adjusted risk score engine, assigning, to each transaction of the set of transactions and the set of new transactions, a new value of the scaled risk score; and
    combining the set of transactions and the new set of transactions.

3. A method according to claim 2, further comprising:
    prior to assigning, to each transaction of the set of transactions and the set of new transactions, a new value of the scaled risk score, purging transactions of the set of transactions having been received earlier than a specified time.

4. A method according to claim 1, further comprising:
    selecting transactions having values of the scaled risk score greater than a second threshold value of the scaled risk score, the second threshold value of the scaled risk score being greater than the specified threshold value of the scaled risk score; and
    sending the selected transactions to a backend evaluator, the backend evaluator being constructed and arranged to generate authentication data which is used, upon receipt, to further adjust the configuration of the risk score engine.

5. A method according to claim 4, wherein the authentication data includes a set of authentication parameters;
    wherein the risk score engine includes a set of Bayesian weights, each Bayesian weight of the set of Bayesian weights corresponding to an authentication parameter of the set of authentication parameters;
    wherein adjusting the configuration of the risk score engine includes:
        increasing a value of a Bayesian weight of the set of Bayesian weights when the corresponding authentication parameter of the set of authentication parameters belongs to authentication data which is associated with a transaction generated by a fraudulent user; and
        decreasing a value of a Bayesian weight of the set of Bayesian weights when the corresponding authentication parameter of the set of authentication parameters belongs to authentication data which is associated with a transaction generated by a legitimate user.

6. A method according to claim 1, wherein each transaction of the set of transactions includes a value of a partition key;
    wherein assigning, to each transaction of the set of transactions, the previous value of a scaled risk score includes:
        grouping each transaction of the set of transactions having a particular value of the partition key into a set of transactions having the particular value of the partition key, the transaction being arranged in descending order according to the previous value of the risk score of the transaction;
        producing a percentile value the transaction according to an empirical cumulative distribution function; and
        generating the previous value of a scaled risk score for the transaction based on the percentile value.

7. A method according to claim 6, further comprising:
    adjusting a value of a Bayesian weight of the set of Bayesian weights based on the particular value of the partition key.

8. A method according to claim 1, further comprising:
    performing an adaptive authentication operation on a transaction of the set of transactions, the adaptive authentication operation being configured to provide an authentication of a user based on the value of the risk score of the transaction.

9. A method according to claim 1,
    wherein assigning the previous value of the scaled risk score, each value of the set of values of the scaled risk score corresponding to the percentile of values of the risk score includes:
        performing a mapping operation between the previous value of the scaled risk score and the previous value of the scaled risk score, the mapping operation providing a nonlinear map between the previous value of the scaled risk score and the previous value of the scaled risk score.

10. A system constructed and arranged to identify risky transactions from a set of transactions, each transaction of the set of transactions having a previous value of a risk score, the previous value of the risk score having been computed by a risk score engine, the system comprising:
a network interface;
a memory; and
a controller which includes controlling circuitry coupled to the memory, the controlling circuitry being constructed and arranged to:
adjust a configuration of the risk score engine to form an adjusted risk score engine, the adjusted risk score engine being constructed and arranged to compute a new value of the risk score for a transaction;
run each transaction of a subset of the set of transactions through the adjusted risk score engine to generate a new value of the risk score for each transaction of the subset of transactions, each transaction of the subset of transactions having the previous value of the risk score of the transaction being above a threshold value of the risk score;
not run transactions of another subset of the set of transactions through the adjusted risk score engine, each transaction of the another subset of transactions having the previous value of the risk score of the transaction being below the threshold value of the risk score;
prior to adjusting the configuration of the risk score engine, sort the set of transactions in a descending order according to the previous value of the risk score of each transaction of the set of transactions, and
assign, to each transaction of the set of transactions, a previous value of a scaled risk score, a set of values of the scaled risk score having a specified minimum value and maximum value, each value of the set of values of the scaled risk score corresponding to a percentile of values of the risk score;
wherein the threshold value of the risk score corresponds to a specified threshold value of the scaled risk score.

11. A system according to claim 10, wherein the controlling circuitry is further constructed and arranged to:
receive a set of new transactions within a unit of time;
run each transaction of the set of new transactions through the adjusted risk score engine to generate a new value of the risk score for the transaction as the transaction is received;
after running each transaction of the subset of the set of transactions and the set of new transactions through the adjusted risk score engine, assign, to each transaction of the set of transactions and the set of new transactions, a new value of the scaled risk score; and
combine the set of transactions and the new set of transactions.

12. A system according to claim 11, wherein the controlling circuitry is further constructed and arranged to:
prior to assigning, to each transaction of the set of transactions and the set of new transactions, a new value of the scaled risk score, purge transactions of the set of transactions having been received earlier than a specified time.

13. A system according to claim 10, wherein the controlling circuitry is further constructed and arranged to:
select transactions having values of the scaled risk score greater than a second threshold value of the scaled risk score, the second threshold value of the scaled risk score being greater than the specified threshold value of the scaled risk score; and
send the selected transactions to a backend evaluator, the backend evaluator being constructed and arranged to generate authentication data which is used, upon receipt, to further adjust the configuration of the risk score engine.

14. A system according to claim 13, wherein the authentication data includes a set of authentication parameters;
wherein the risk score engine includes a set of Bayesian weights, each Bayesian weight of the set of Bayesian weights corresponding to an authentication parameter of the set of authentication parameters;
wherein adjusting the configuration of the risk score engine includes:
increasing a value of a Bayesian weight of the set of Bayesian weights when the corresponding authentication parameter of the set of authentication parameters belongs to authentication data which is associated with a transaction generated by a fraudulent user; and
decreasing a value of a Bayesian weight of the set of Bayesian weights when the corresponding authentication parameter of the set of authentication parameters belongs to authentication data which is associated with a transaction generated by a legitimate user.

15. A system according to claim 10, wherein each transaction of the set of transactions includes a value of a partition key;
wherein assigning, to each transaction of the set of transactions, the previous value of a scaled risk score includes:
grouping each transaction of the set of transactions having a particular value of the partition key into a set of transactions having the particular value of the partition key, the transaction being arranged in descending order according to the previous value of the risk score of the transaction;
producing a percentile value the transaction according to an empirical cumulative distribution function; and
generating the previous value of a scaled risk score for the transaction based on the percentile value.

16. A computer program product having a non-transitory, computer-readable storage medium which stores code to identify risky transactions from a set of transactions, each transaction of the set of transactions having a previous value of a risk score, the previous value of the risk score having been computed by a risk score engine the code including instructions to:
adjust a configuration of the risk score engine to form an adjusted risk score engine, the adjusted risk score engine being constructed and arranged to compute a new value of the risk score for a transaction;
run each transaction of a subset of the set of transactions through the adjusted risk score engine to generate a new value of the risk score for each transaction of the subset of transactions, each transaction of the subset of transactions having the previous value of the risk score of the transaction being above a threshold value of the risk score;
not run transactions of another subset of the set of transactions through the adjusted risk score engine, each transaction of the another subset of transactions having the previous value of the risk score of the transaction being below the threshold value of the risk score;

prior to adjusting the configuration of the risk score engine, sort the set of transactions in a descending order according to the previous value of the risk score of each transaction of the set of transactions, and assign, to each transaction of the set of transactions, a previous value of a scaled risk score, a set of values of the scaled risk score having a specified minimum value and maximum value, each value of the set of values of the scaled risk score corresponding to a percentile of values of the risk score;

wherein the threshold value of the risk score corresponds to a specified threshold value of the scaled risk score.

17. A computer program product according to claim 16, wherein the code further includes instructions to:

receive a set of new transactions within a unit of time;

run each transaction of the set of new transactions through the adjusted risk score engine to generate a new value of the risk score for the transaction as the transaction is received;

after running each transaction of the subset of the set of transactions and the set of new transactions through the adjusted risk score engine, assign, to each transaction of the set of transactions and the set of new transactions, a new value of the scaled risk score; and combine the set of transactions and the new set of transactions.

18. A computer program product according to claim 17, wherein the code further includes instructions to:

prior to assigning, to each transaction of the set of transactions and the set of new transactions, a new value of the scaled risk score, purge transactions of the set of transactions having been received earlier than a specified time.

19. A computer program product according to claim 16, wherein the code further includes instructions to:

select transactions having values of the scaled risk score greater than a second threshold value of the scaled risk score, the second threshold value of the scaled risk score being greater than the specified threshold value of the scaled risk score; and send the selected transactions to a backend evaluator, the backend evaluator being constructed and arranged to generate authentication data which is used, upon receipt, to further adjust the configuration of the risk score engine.

20. A computer program product according to claim 19, wherein the authentication data includes a set of authentication parameters;

wherein the risk score engine includes a set of Bayesian weights, each Bayesian weight of the set of Bayesian weights corresponding to an authentication parameter of the set of authentication parameters;

wherein adjusting the configuration of the risk score engine includes:

increasing a value of a Bayesian weight of the set of Bayesian weights when the corresponding authentication parameter of the set of authentication parameters belongs to authentication data which is associated with a transaction generated by a fraudulent user; and decreasing a value of a Bayesian weight of the set of Bayesian weights when the corresponding authentication parameter of the set of authentication parameters belongs to authentication data which is associated with a transaction generated by a legitimate user.

* * * * *